United States Patent [19]

Lehle

[11] Patent Number: 4,807,732
[45] Date of Patent: Feb. 28, 1989

[54] MULTIPLE-DISC CLUTCH FOR TRACTOR PTO SHAFT

[75] Inventor: Hubert Lehle, Meckenbeuren, Fed. Rep. of Germany

[73] Assignee: Zahnradfabrik Friedrichshafen AG, Fed. Rep. of Germany

[21] Appl. No.: 71,031

[22] Filed: Jul. 8, 1987

Related U.S. Application Data

[63] Continuation of Ser. No. 878,966, May 1, 1986, abandoned.

[30] Foreign Application Priority Data

Oct. 24, 1984 [WO] World Int. Prop. O. ............. PCT/EP84/00330

[51] Int. Cl.⁴ .................. F16D 25/10; F16D 25/06
[52] U.S. Cl. ........................ 192/48.5; 192/48.7; 192/48.91; 192/85 AA; 192/87.15
[58] Field of Search ............ 192/48.5, 48.7, 48.91, 192/70.12, 70.21, 85 AA, 87.15, 113 B

[56] References Cited

U.S. PATENT DOCUMENTS

| 952,535 | 3/1910 | Loomis | 192/48.5 X |
|---|---|---|---|
| 1,138,098 | 5/1915 | Fornaca | 192/87.15 |
| 1,435,903 | 11/1922 | Holmes | 192/48.5 X |
| 3,063,529 | 9/1962 | Cook | 192/48.5 X |
| 3,252,553 | 3/1966 | Peterson | 192/48.5 X |
| 3,300,004 | 2/1967 | Peterson | 192/48.7 X |
| 3,722,645 | 3/1973 | Sommer | 192/113 B X |
| 3,823,802 | 7/1974 | Winzeler et al. | 192/113 B |
| 3,938,631 | 2/1976 | Smith | 192/113 B X |
| 4,147,245 | 4/1979 | Folomin et al. | 192/85 AA |

FOREIGN PATENT DOCUMENTS

| 1215450 | 4/1966 | Fed. Rep. of Germany . |
|---|---|---|
| 1251100 | 9/1967 | Fed. Rep. of Germany . |
| 2431104 | 4/1976 | Fed. Rep. of Germany . |
| 2388173 | 11/1978 | France . |
| WO86/02704 | 5/1986 | World Int. Prop. O. ......... 192/48.5 |

Primary Examiner—Leslie A. Braun
Assistant Examiner—Richard M. Lorence
Attorney, Agent, or Firm—Davis, Bujold & Streck

[57] ABSTRACT

A claw clutch (42) is added in line to a multiple-disc clutch 40. One actuating member 21 engages first the claw clutch 42 and then, almost simultaneously, the multiple-disc clutch 40. Return springs 37 disengage first the multiple-disc clutch 40 and then, almost simultaneously, the claw clutch 40. The multiple-disc clutch 40 can be engaged under full power. A dangerous drag moment of the multiple-disc clutch 40 is active only for a very short time when the clutch system is just being disengaged, immediately thereafter only the harmless redidual moment of the claw clutch 42 remains active.

6 Claims, 1 Drawing Sheet

U.S. Patent
Feb. 28, 1989
4,807,732
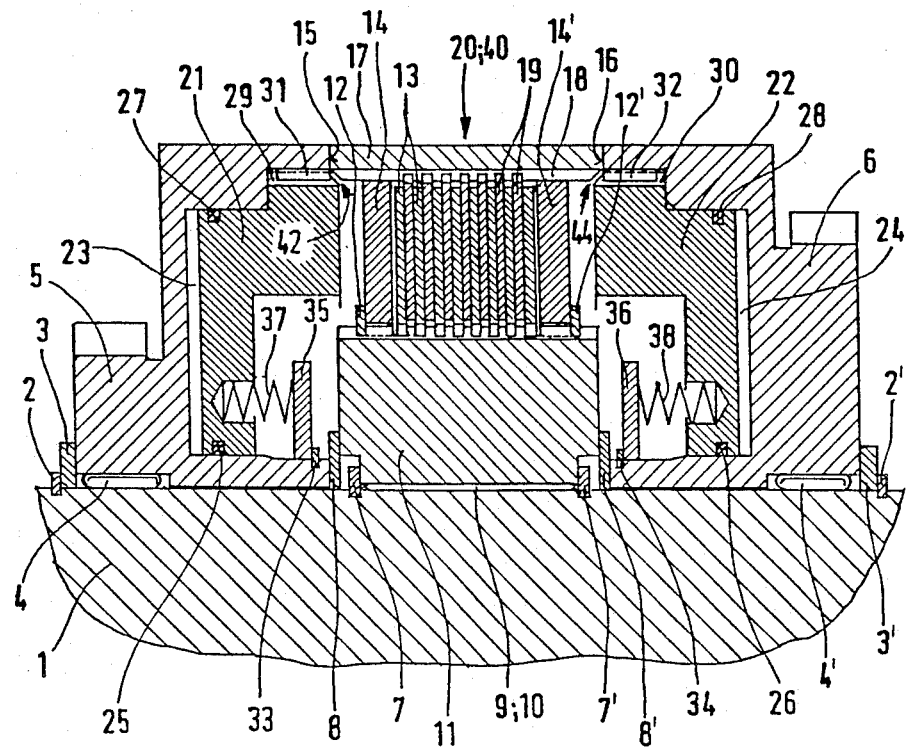

MULTIPLE-DISC CLUTCH FOR TRACTOR PTO SHAFT

This is a continuation of copending application(s) Ser. No. 878,966 filed on May 21, 1986 now abandoned.

The invention concerns a multiple-disc clutch for a tractor PTO shaft. The multiple-disc clutch can connect the shaft to a concentric idler gear in a power-shiftable non-positive manner.

When disengaged, such a multiple-disc clutch still has a drag moment. This drag moment can endanger a person touching the free end of the PTO shaft. To avoid this danger, it is usual to provide a special PTO shaft brake. With this brake engaged, the drag moment, together with a high speed of the idler gear, can heat the clutch to destruction.

It is an object of the invention to provide a fool-proof multiple-disc clutch for a tractor PTO shaft. Even an unskilled driver shall no longer be able to damage the clutch by running full speed against an engaged PTO shaft brake, or to endanger a person touching the free end of the PTO shaft.

According to the invention, a positive claw clutch is added in line with the non-positive multiple-disc clutch, one actuating member engages first the claw clutch and then the multiple-disc clutch, and disengages first the multiple-disc clutch and then the claw clutch. The dangerous drag moment of the multiple-disc clutch is active only for a very short time when the clutch system is just being disengaged, immediately thereafter only the harmless residual moment of the claw clutch remains active, and no PTO shaft brake is needed to prevent danger from a person touching the free end of the PTO shaft.

It is a further object of the invention to provide a two-speed power-shiftable PTO shaft using only a single disc set for both of these two speeds.

According to the invention, a second positive claw clutch and a second actuating member are added to be able to connect and disconnect a second idler gear to and from the PTO shaft. The second actuating member engages first the second claw clutch and then the multiple-disc clutch, and disengages first the multiple-disc clutch and then the second claw clutch.

The only figure of the drawing shows a part of a longitudinal section of a two speed PTO shaft assembly.

An inner disc carrier 11 is fixed to a shaft 1 via splines 9, 10 and guard rings 7, 7', 8, 8'. The inner disc carrier 11 carries inner discs 13 and end discs 14, 14' axially movably between guard rings 12, 12'. The end discs 14, 14' radially support an outer disc carrier 17 with outer discs 19 in splines 18. The discs 13, 14, 14', 19 form a disc set 20. The disc carriers 11, 17 and the disc set 20 form a power-shiftable, non-positive multiple-disc clutch 40.

A first and a second idler gear 5, 6 are radially supported on the shaft 1 via roller bearings 4, 4'. The idler gears 5, 6 and the outer disc carrier 17 are axially fixed to the shaft 1 via guard rings 2, 2' and thrust washers 3, 3'. The outer disc carrier 17 is positioned between and abuts the idler gears 5, 6 at surfaces 15, 16, respectively.

The idler gears 5, 6 form cylinderes with a first and a second actuating chamber 23, 24. A first and a second actuating member 21, 22 form pistons in the cylinders, sealed by sealing rings 25, 27; 26, 28. The first actuating member 21 and the outer disc carrier 17 form a first shiftable positive claw clutch 42 via splines 29, 18. The second actuating member 22 and the outer disc carrier 17 form a second positive claw clutch 44 via splines 30, 18.

The first actuating member 21 is non-rotatably and axially movably connected with the first idler gear 5 via splines 29, 31. The second actuating member 22 is non-rotatably and axially movably connected with the second idler gear 6 via splines 30, 32.

Return springs 37, 38 axially between the actuating members 21, 22 and the idler gears 5, 6 via guard rings 33, 34 and spring plates 35, 36 move and keep the actuating member 21, 22 in a first final position (shown in the drawing) away from the disc set 20. In this case, the idler gears 5, 6 can rotate freely on the shaft 1, with a very low residual moment which cannot cause any danger to a person touching the free end of the PTO shaft 1.

Pressure oil in the first actuating chamber 23, not shown, presses the first actuating member 21 toward the disc set 20 and engages first the first claw clutch 42 and then, almost simultaneously, the multiple-disc clutch 40. When the pressure oil is allowed to escape again, the return springs 37 again move the first actuating member 21 away from the disc set 20 and disengages first the multiple-disc clutch 40 and then, almost simultaneously, the first claw clutch 42.

Pressure oil in the second actuating chamber 24, not shown, presses the second actuating member 22 toward the disc set 20 and engages first the second claw clutch 44 and then, almost simultaneously, the multiple-disc clutch 40. When the pressure oil is allowed to escape again, the return springs 38 again move the second actuating member 22 away from the disc set 20 and disengge first the multiple-disc clutch 40 and then, almost simultaneously, the second claw clutch 44.

While the non-positive multiple-disc clutch 40 allows full-power shifting, while it allows engaging gear at the highest speed and highest torque, the positive claw clutches 42, 44 make possible an almost complete disconnection.

A single multiple-disc clutch 40, combined with two claw clutches 42, 44 provides two speeds for a tractor PTO shaft. The outer disc carrier 17 of the multiple-disc clutch 40 is additionally a structural part of two claw clutches 42, 44.

REFERENCE NUMERALS

1: shaft
2: guard ring
3: thrust washer
4: roller bearing
5: idler gear
6: idler gear
7: guard ring
8: thrust washer
9: splines
10: splines
11: inner disc carrier
12: guard ring
13: inner disc
14: end disc
15: front surface
16: front surface
17: outer disc carrier
18: splines
19: outer disc
20: disc set
21: actuating member 22: actuating member
23: actuating chamber
24: actuating chamber
25: sealing ring
26: sealing ring
27: sealing ring
28: sealing ring
29: splines
30: splines
31: splines
32: splines
33: guard ring
34: guard ring
35: spring plate
36: spring plate
37: return spring
38: return spring
39: double clutch
40: multiple-disc clutch
41: axis
42: claw clutch
43: claw clutch.

We claim:

1. A multiple disk clutch for a tractor PTO shaft comprising: a shaft having an inner disc carrier (11) connected thereto via splines (9, 10) and guard rings (7, 7′, 8, 8′), said inner disc carrier carrying inner discs (13) and end discs (14) axially moveably between other guard rings (12, 12′); the end discs (14) supporting an outer disc carrier (17) carrying outer discs (19) via inner splines (18); the discs (13, 14, 19) forming a disc set (20) of a power shiftable multiple-disk clutch (40); two idler gears (5, 6), one being supported and axially fixed to the shaft (1) on each side of the outer disc carrier (17), each forming a cylinder having an actuating chamber (23 or 24) with an actuating member (21 or 22) moveable therein; each actuating member (21 or 22) being non-rotatably and axially moveably connected with its idler gear (5 or 6), via an outer spline (29 or 31), and forming a shiftable positive claw clutch (42 or 44) with the outer disc carrier (17); a return spring (37 or 38) biasing each actuating member (21 or 22) into a disengaged position away from the disc set (20); wherein when pressure is supplied to an actuating chamber (23 or 24) the fluid forces the associated actuating member (21 or 22) toward the disc set (20) and engages the associated claw clutch and then, almost simultaneously, the multiple disk clutch (40); and when the pressure in the said actuating chamber (23 or 24) decreases, the associated return spring (37 or 38) forces the said associated actuating member (21 or 22) away from the disc set (20) and disengages the multiple-disc clutch (40) and then, almost simultaneously, the engaged claw clutch.

2. A multiple disc clutch in accordance with claim 1, wherein each actuating member (21 or 22) forms a piston in the actuating chamber (23 or 24) and is sealed by sealing rings (25, 27 or 26, 28), one of the actuating members (21) and the outer disc carrier (17) forming a first shiftable positive claw clutch (42) and the other actuating member (22) and the outer disc carrier (17) forming a second shiftable positive claw clutch (44).

3. A multiple disc clutch in accordance with claim 1, wherein each return spring (37 or 38) is axially located between a spring plate (35 or 36) and the idler gear (5 or 6) and forces the actuating member (21 or 22) into a disengaged position away from the disc set (20).

4. A multiple disc clutch according to claim 1, wherein the pressure in the actuating chamber (23 or 24) first moves the actuating member (21 or 22) axially against the outer disc carrier (17) into an intermediate position where one of the positive claw clutches (42 or 44) is fully engaged and the multiple-disc clutch (40) is fully disengaged, and further movement of the actuating member (21 or 22) into an end position fully engages the multiple disc clutch (40).

5. A multiple disc clutch in accordance with claim 1, wherein the outer disc carrier (17) has only one ring of inner splines (18), both actuating members (21, 22) have only one ring of outer splines (29, 30) and the inner splines (18) of the outer disc carrier (17) fit into the outer splines (29 or 30) of the actuating members (21 or 22) and into the outer discs (19).

6. A multiple disk clutch for a tractor PTO shaft comprising: a shaft having an inner disc carrier (11) connected thereto via splines (9, 10) and guard rings (7, 7′, 8, 8′), said inner disc carrier carrying inner discs (13) and end discs (14) axially moveably between other guard rings (12, 12′); the end discs (14) supporting an outer disc carrier (17) carrying outer discs (19) via inner splines (18); the discs (13, 14, 19) forming a disc set (20) of a power shiftable multiple-disk clutch (40); at least one idler gear (5 or 6) being supported and axially fixed to the shaft (1) on one side of the outer disc carrier (17); the at least one idler gear forming a cylinder having an actuating chamber (23 or 24) with an actuating member (21 or 22) moveable therein; the actuating member (21 or 22) being non-rotatably and axially moveably connected with the idler gear (5 or 6) via an outer spline (29 or 31) and forming with the outer disc carrier (17) a shiftable positive claw clutch (42 or 44); a spring means (37 or 38) biasing the actuating member (21 or 22) into a disengaged position away from the disc set (20); wherein when pressure fluid is supplied to the actuating chamber (23 or 24) the fluid forces the actuating member (21 or 22) toward the disc set (20) and engages a claw clutch and then, almost simultaneously, the multiple disk clutch (40); and when the pressure in actuating chamber (23 or 24) decreases, the spring means (37 or 38) forces the actuating member (21 or 22) away from the disc set (20) and disengages the multiple-disc clutch (40) and then, almost simultaneously, the claw clutch.

* * * * *